(12) United States Patent  
Lenormand et al.

(10) Patent No.: US 7,222,346 B2
(45) Date of Patent: May 22, 2007

(54) SYSTEM AND METHOD FOR THE MANAGEMENT OF A MULTIPLE-RESOURCE ARCHITECTURE

(75) Inventors: Eric Lenormand, Paris (FR); Philippe Bonnot, Paris (FR)

(73) Assignee: Thales, Paris (FR)

( * ) Notice: Subject to any disclaimer, the term of this patent is extended or adjusted under 35 U.S.C. 154(b) by 871 days.

(21) Appl. No.: 09/861,584

(22) Filed: May 22, 2001

(65) Prior Publication Data

US 2002/0038329 A1    Mar. 28, 2002

(30) Foreign Application Priority Data

May 23, 2000    (FR) .................................. 00 06569

(51) Int. Cl.
    *G06F 9/46*    (2006.01)
(52) U.S. Cl. ...................... 718/106; 718/104
(58) Field of Classification Search ................ 718/103, 718/106, 104
    See application file for complete search history.

(56) References Cited

U.S. PATENT DOCUMENTS

| | | | | |
|---|---|---|---|---|
| 4,149,243 A | * | 4/1979 | Wallis | 718/106 |
| 4,809,169 A | * | 2/1989 | Sfarti et al. | 712/20 |
| 5,050,065 A | | 9/1991 | Dartois et al. | |
| 5,918,049 A | * | 6/1999 | Syvaniemi | 718/104 |
| 6,035,321 A | * | 3/2000 | Mays | 718/103 |
| 6,286,135 B1 | * | 9/2001 | Santhanam | 717/146 |

FOREIGN PATENT DOCUMENTS

EP    0 483 970 A1    5/1992

OTHER PUBLICATIONS

Asawaree Kalavade, et al.; "Software Environment for a Multiprocessor DSP";Networked Multimedia Research Dept. and DSP and VLSI Systems Research, Dept.; pp. 827-830.

A. Gunzinger, et al.; "Achieving Super Computer Performance With a DSP Array Processor", Supercomputing '92, IEEE Nov. 16-20, 1992; pp. 543-550.

* cited by examiner

*Primary Examiner*—Meng-Al T. An
*Assistant Examiner*—Camquy Truong
(74) *Attorney, Agent, or Firm*—Oblon, Spivak, McClelland, Maier & Neustadt, P.C.

(57) ABSTRACT

In the field of programmable integrated circuits designed for applications of high-powered computation, a compact system of low complexity is proposed to implement a static schedule scheme for real-time resource management, capable of taking account of the completion of a task. This system, used for the management of a multiple-resource architecture in which several resources can simultaneously execute different tasks, comprises: at least one management means ($G_i^j$) for the execution of a part (j, $0 \leq j$) of a set or subset (i, $0 \leq i$) of one or more tasks; at least one means of control ($C_i$) of the means or plurality of means of management ($G_i^j$) of the execution of said set or subset of task(s); at least one means of verifying the completion of one or more given tasks, each completion verification means being associated with all or part of the management means ($G_i^j$) and/or all or part of the control means ($C_i$) and/or all or part of the resources; and/or an initialization means used to initialize all or part of the preceding means.

28 Claims, 5 Drawing Sheets

SYSTEM AND METHOD FOR THE MANAGEMENT OF A MULTIPLE-RESOURCE ARCHITECTURE

BACKGROUND OF THE INVENTION

Field of the Invention

The invention relates to the field of digital computation programmable integrated circuits designed for high computing power applications, for example in applications characterized by algorithms based on imbricated loops whose running depends little or not at all on the data to be processed. This type of application can be encountered especially in the first stages of digital signal processing.

The circuits considered contain several physical resources capable of executing a microprogram that implements a special function such as, for example, a computation (the performance of microprogrammed arithmetic operations on a set of data) or a data transfer (the conveyance of a set of data from one memorization zone to another zone). The physical resources work in parallel, each executing a microprogram sequentially, or as the case may be, in a loop. There are two modes of management of the execution of a program by these physical resources.

In the first mode, a single program is run commonly. A single instruction containing a field (a micro-instruction) for each of the physical resources is active at each elementary cycle. This is the case with the VLIW (Very Long Instruction Word) architectures.

Alternatively, the microprograms are specific to the physical resources, thus enabling the resources to execute and especially to repeat certain sequences independently and at their own pace.

The second mode is the one chosen by most digital signal processors (DSPs) because it allows the architecture to have high flexibility. The main resource is the operative part (the one carrying out arithmetic operations). It works at its own pace in parallel with the data transfer resources known as DMA (Dynamic Memory Access) controllers. Furthermore, it is assumed that the resources can be downloaded.

Figure 1:
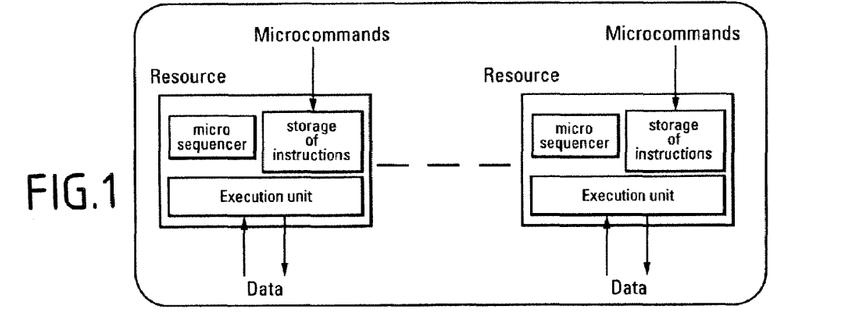
FIG. 1 a basic drawing of a multiple-resource architecture according to the prior art.

As can be seen in FIG. 1, each resource is capable of initially memorizing a set of microcommands or micro-instructions of its own, sufficient for the execution of its task. External intervention is not necessary except to provide these microcommands and initialize their execution. Each resource then works independently with respect to other resources; in return, it may report the end of execution of the task for which it has been configured. The micro-instruction memorization unit in each resource can be seen as a cache memory used to reduce the mean input bit rate of the microcommands coming from outside the circuit (this is a common difficulty with high-powered computation circuits and is related to the passband of the program).

In order to carry out the parallel execution of tasks by several resources, a device for managing the execution of tasks by resources according to a static scheduling scheme is implemented. The management of the execution by the resources of the microprograms is done by sequencing at one or two levels.

The standard approach used especially in digital signal microprocessors (DSPs) consists in including scheduling directives in the operative part of the program. The sequencing is then done only at one level. The microprograms are specific to each resource, which leaves them free to be executed at their own pace (especially for the repeating of certain sequences independently of their neighbors).

As can be seen in FIG. 1, the microsequencer proper to a given resource then runs the microprogram of this resource independently with respect to the other resources. Most of the instructions are designed for the computation resource. Some of them are used to parameterize the transfer resources. The main drawback of the sequencing at one level is the simultaneous management, by the microsequencers of the different resources, of numerous activities each producing events (end of an iteration, end of loop, etc.) desynchronized with the activity of the others. This gives rise to the need to be able to interrupt an activity in order to launch another one or take account of the completion of a task, giving rise to a relatively complex logic (management of interruptions, saving of context, etc.) inducing high design costs.

The applications envisaged by the invention are simple. They therefore provide the hope of simpler, high-performance circuit embodiments. This is why two distinct levels of sequencing are introduced:

a fast sequencing level for each of the resources that do not manage asynchronous events;

a total sequencing level controlling the downloading of the microprogram in each of the resources and their launching. The use of this second level provides for a reduction of the microprogram bit rate because the downloading can be done in parallel without slowing down the activity of the resources). This total sequence level may be more or less elaborated.

One elaboration consists in running a program by forcing the task launching times without taking account of the completion messages. This is direct launching at predetermined instants. This preparation is simpler and more reactive but it accepts no variation of the task execution time and becomes a problem in the case of multimode operations.

Another preparation consists of the use of a processing core type structure but this is a bulky and less reactive approach.

The present invention is used to overcome or at least reduce these drawbacks by proposing a compact system of low complexity to implement a static schedule scheme for the real-time resource management capable of taking account of the completion of a task.

SUMMARY OF THE INVENTION

To this end, an object of the invention is a system used for the management of a multiple-resource architecture in which several resources can simultaneously execute different tasks, wherein the method comprises:

at least one means for the management of the execution of a part of a set or subset of one or more tasks, at least one means of control of the means or plurality of means of management of the execution of said set or subset of tasks, at least one means of verifying the completion of one or more given tasks, each completion verification means being associated with all or part of the management means and/or all or part of the control means and/or all or part of the resources, and/or an initialization means used to initialize all or part of the preceding means.

The invention relates to a programmable integrated circuit comprising a single program memory comprising:

an input receiving the address signals sent by said system, and a output transmitting the tasks to be executed to said system and to the resources of said circuit.

The system of management of a multiple-resource architecture proposed by the present invention, hereinafter called an organizer, uses a method for the management of a multiple-resource architecture in which several resources can simultaneously execute different tasks, wherein the system comprises at least the following steps:

a the management of the execution of at least one part of a set or subset of one or more tasks, the control of the management of each part or at least one set or subset of one or more tasks, the verification of the completion of the execution of at least one task during the management and/or control and/or execution by the resources, the initialization of all or part of the above steps.

BRIEF DESCRIPTION OF THE DRAWINGS

The characteristics and advantages of the invention shall appear more clearly from the following description, given by way of an example and from the appended figures, of which.

MORE DETAILED DESCRIPTION

Figure 2:
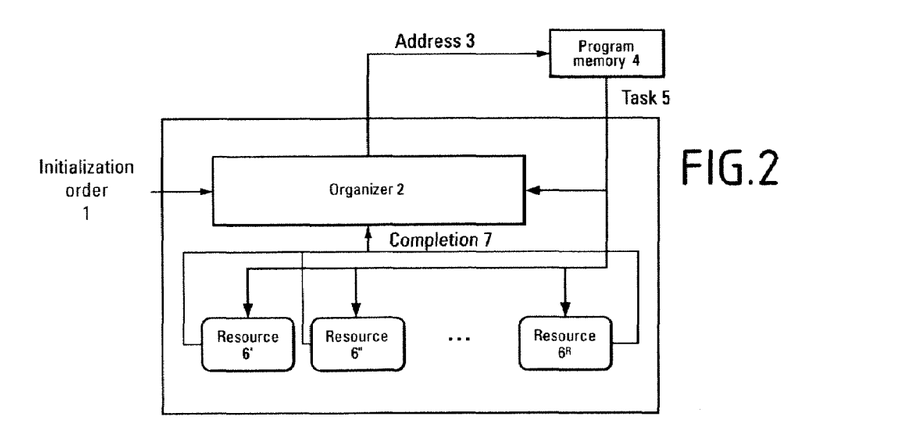
FIG. 2 is an exemplary basic diagram of a multiple-resource architecture with two sequencing levels according to the invention.

FIG. 2 is an exemplary basic drawing of a multiple-resource architecture according to the invention. The initialization order 1 induces the sending, by the organizer 2, of a signal 3 containing an address to a single program memory 4. The code stored in the program memory 4 is formed out by:

code sequences specific to the resources for which the are intended, scheduling directives that reflect the scheduling pattern of the activities, intended for the organizer 2.

The task 5 that is at the address 3 is therefore executed either by one of the resources 6 if it is a processing instruction or by the organizer 2 if it is a scheduling directive. When a resource 6 has terminated the execution of the instruction, it reports the completion 7 of this instruction to the organizer 2.

Figure 3:
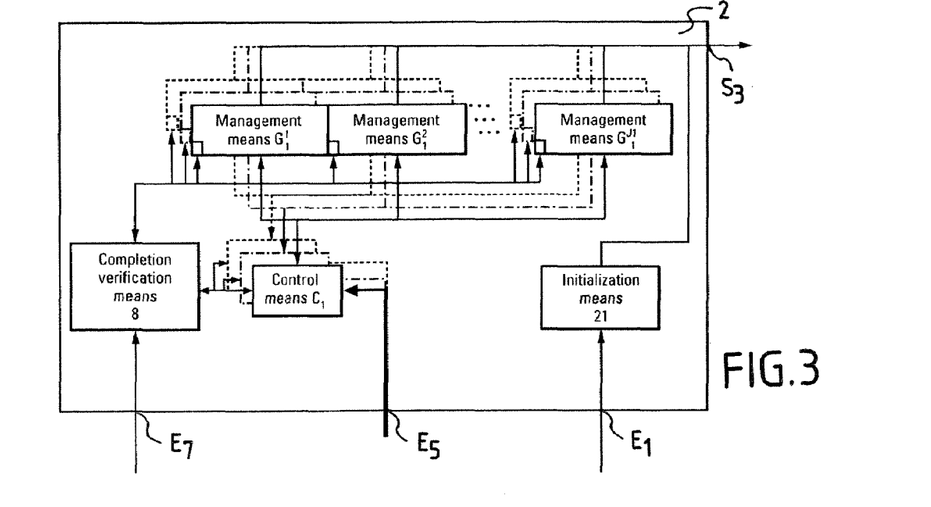
FIG. 3 is an exemplary diagrammatic view of the organizer according to the invention.

FIG. 3 shows an exemplary schematic drawing of the organizer 2 according to the invention. The initialization command 1 is received through the input $E_1$ by the initialization means 21 which together initialize the means of the organizer 2 (not shown in the figure) and send the first address 3 to the address output $S_3$. The task to be executed 5 read at this address 3 is received by the resources and the organizer 2 at its input $E_5$ and transmitted i to the control means $C_i$ of the means $G_i^j$ for the management of the execution of one or more of the parts j of a set or subset of task(s) i. The tasks 5 contain, for example, either the indication of their addressee or the indication of the type (computation, transfer, scheduling). During the execution of a part j of a set or subsets of task(s) i, the management means $G_i^j$ sends an address 3 to the output $S_3$. A completion verification means 8 ascertains that the completion awaited by the management means $G_i^{j'}$, namely the end of execution of one or more tasks expected by the management means $G_i^{j'}$ is the completion reported by one of the resources 6 or one of the management means $G_i^j$ or one of the control means $C_i$.

Seen from a particular resource 6, this resource downloads the micro-instructions that reach it and activates their execution as soon as the launching order reaches it. These tasks 5 (micro-instructions and launching command) are read sequentially in the program memory 4 from the address transmitted by the organizer 2. The role of the organizer 2 is to manage the corresponding sequence of addresses for the right number of times if it is a loop, and to do so at the right times. The scheduling directives enable it to initialize and carry out the parallel management of as many program address pointers as there are parts j in the set or subset of tasks i.

Let us take the example of the management of a multiple-resource architecture by an organizer 2 for the performance of a set i of tasks forming a program loop i. A management means $G_i^j$ of a part j of a set or subset i of tasks is then a means of management of the execution of the part or stage j of a main or imbricated program loop i, namely a means of management hereinafter called a LAYER $G_i^j$. The control means $C_i$ of the LAYERS $G_i^j$ is hereinafter called a KERNEL $C_i$. Each of the KERNELS $C_i$ has a different loop level I corresponding to it. There are therefore several KERNELS $C_i$ in hierarchical levels for the imbricated loops.

Figure 4:
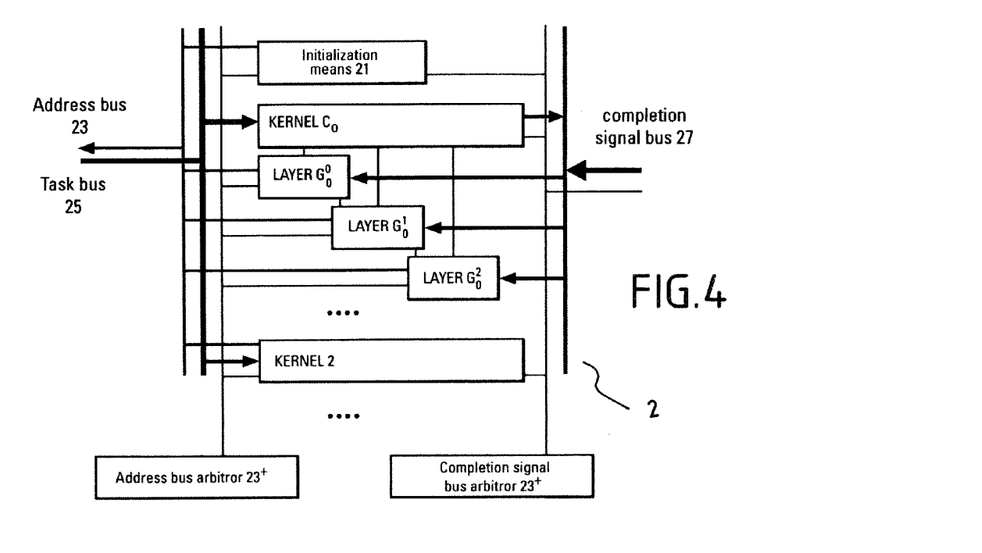
FIG. 4 shows an exemplary architecture of the organizer according to the invention.
Figure 5:
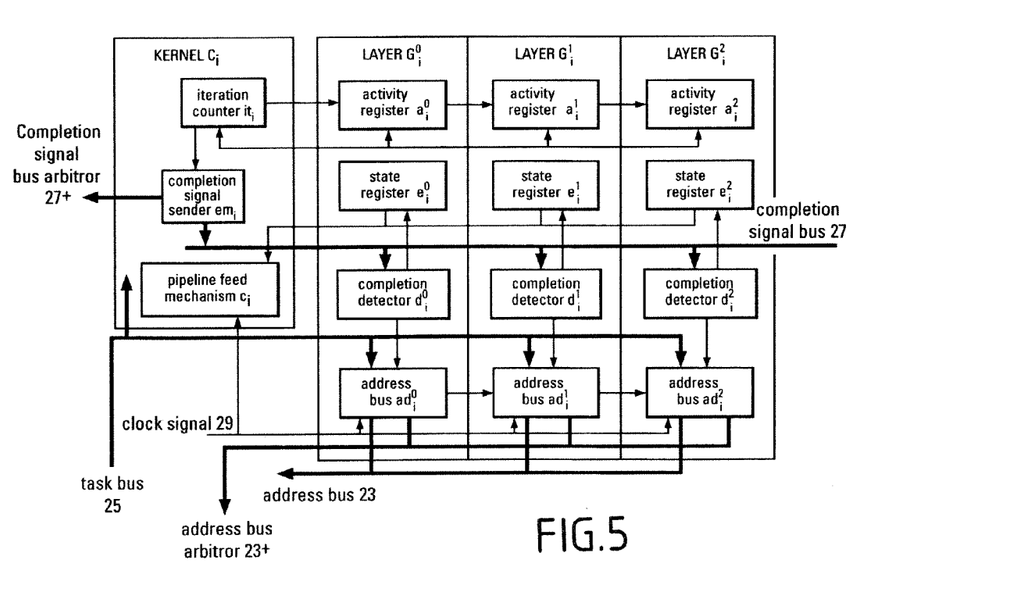
FIG. 5 shows an exemplary detailed embodiment of a part of the organizer of FIG. 4, FIG. 6 exemplifies the principle of operation of an organizer according to the invention, FIG. 7 exemplifies the detailed operation of the organizer during the performance of a scheduling directive.

FIG. 4 proposes an exemplary architecture of the organizer 2 applied to the management of the execution of a program loop i. FIG. 5 gives a detailed exemplary embodiment of a KERNEL $C_i$, of the associated LAYERS $G_i^j$ of the architecture proposed by FIG. 4.

For the management of the execution of the iteration number $N_i$ of the loop i according to the initializing parameters of the loop i, the KERNEL $C_i$ has an interaction counter $it_i$ that is initialized at the number of iterations of the loop i to be performed $it_i=N_i$ and decremented $it_i=it_i-1$ at each new iteration of the loop i. When the counter $it_i$ reaches the value 0 and as soon as the access arbitrator $27^+$ for access to the completion bus 27 permits access, the completion signal sender $em_i$ sends a completion signal to report the end of the processing of the loop i.

The authorization of access to the completion bus 27 delivered by the arbitrator $27^+$ gives the right to the use of the completion signal-conveying bus (hereinafter called a completion bus) 27 during one cycle for sending a completion signal 7. In the case of several simultaneous requests, due to the fact that each resource 6 and each KERNEL $C_i$ that has ended its task wishes to send a completion signal 7, the authorization from the arbitrator $27^+$ depends on an order of priority that may be fixed.

The set of LAYERS $G_i^j$ associated with a KERNEL $C_i$ constitutes a shift register chain. The role of the KERNEL $C_i$ is to manage a loop i, control the associated pipeline (the chain formed by the cascade-connected LAYERS $G_i^j$) and synchronize the LAYERS $G_i^j$ with each other. For this purpose, each KERNEL $C_i$ has a pipeline feed mechanism $c_i$. The set formed by the associated KERNEL $C_i$ and LAYERS $G_i^j$ is called SEQPAR.

The information contained in each register of this chain is a state indicator e, a program address counter ad, an indicator a of the state of progress of the pipeline and a dimension indicator (not shown in the figures).

The organizer 2 then comprises a set of activity registers $a_i^j$ that indicate the state of progress of execution in the steps j of the loop i. Only the LAYERS $G_i^j$ validated by the number of stages $J_i$ of the loop i can be activated.

The organizer 2 also has a set of address counters $ad_i^j$ that can be incremented. These counters drive each execution of a stage j of the loop i. Each LAYER $G_i^j$ manages a sequence of addresses $A[j]_i$ thus enabling the parallel execution of the stages j of the loop i. Within a LAYER $G_i^j$, the running of the program is done by incrementation of the address counter $ad_i^j = ad_i^j + 1$. The incrementation of the address counter $ad_i^j = ad_i^j + 1$ is then done during the sending of the signal 3 containing the address $A[j]_i$ of the counter $ad_i^j$; to the program address bus 23. The basic address $A0_i$ initializes the address counter $ad_i^0 = A0_i$ of the first LAYER $G_i^0$, the address counters $ad_i^j$ of the other LAYERS $G_i^j$ are initialized by the address $A[j-1]_i$ contained in the address counter $ad_i^{j-1}$ of the previous LAYER $G_i^{j-1}$ at the beginning of the new iteration.

The state indicator $e_i^j$ indicates whether the LAYER $G_i^j$ is idle, in sending mode, on standby or at end of processing. When a LAYER $G_i^j$ is active and its state register $e_i^j$ is sending, the arbitrator 23⁺ of the address bus 23 notes a request for access to this bus 23 for this LAYER $G_i^j$.

The authorization of access to the completion bus 23 delivered by the arbitrator 23⁺ gives the right to the use of the address bus 23 so long as the requester maintains his request. In the case of several simultaneous requests, due to the fact that each LAYER $G_i^j$ may wish to send a completion signal 3, the authorization from the arbitrator 23⁻ depends on an order of priority that may be fixed.

(Observation mode) When a LAYER $G_i^j$ is active and its state register $e_i^j$ is in the standby state, the completion detector $d_i^j$ of this LAYER $G_i^j$ observes the completion signals 7 sent on the completion bus 27 by the completion signal senders $em_i$ of the KERNELS $C_i$ of the organizer 2 and the resources. When the completion signal 7 received corresponds to the awaited completion code, the state register $e_i^j$ of the LAYER $G_i^j$ comes out of the standby state.

(Memorization mode) When a completion signal 7 is received by the completion detector $d_i^j$ of the LAYER $G_i^j$ while its state register $e_i^j$ is not in a standby state, the completion detector $d_i^j$ memorizes the completion signal 7 received to take it into account when the state register $e_i^j$ goes into a standby state.

When all the LAYERS $G_i^j$ of a KERNEL $C_i$ have their state registers $e_i^j$ at the "end" of processing, the pipeline feed mechanism $c_i$ activates the shifting of the registers of the chain associated with this KERNEL $C_i$ according to the clock signal 29 given by this KERNEL $C_i$ and decrements the iteration counter $it_i$ of this KERNEL $C_i$. The contents of a register are therefore passed on to the next LAYER $G_i^{j+1}$ when the pipeline i (the shift register string associated with the KERNEL $C_i$) moves forward.

The execution of the program loop i can thus be managed by making the data addressing information (contained in the dimension indicator register which is not shown) and the program $ad_i^{j+1} = ad_i^j$ follow on throughout this chain. This information may thus also be specific to a given recurrence (multimode programming). Consequently, the codes linked to an iteration are necessarily sequential. Once the basic address $A0_i$ has been addressed, the organizer 2 controls all the operations of execution without external intervention.

Since it has only sequenced registers and counters, the organizer 2 proposes the use of a small volume of material. Furthermore, since it has only one task bus 25, the flow rate of the tasks 5 needed for the scheduling is low.

Figure 6:
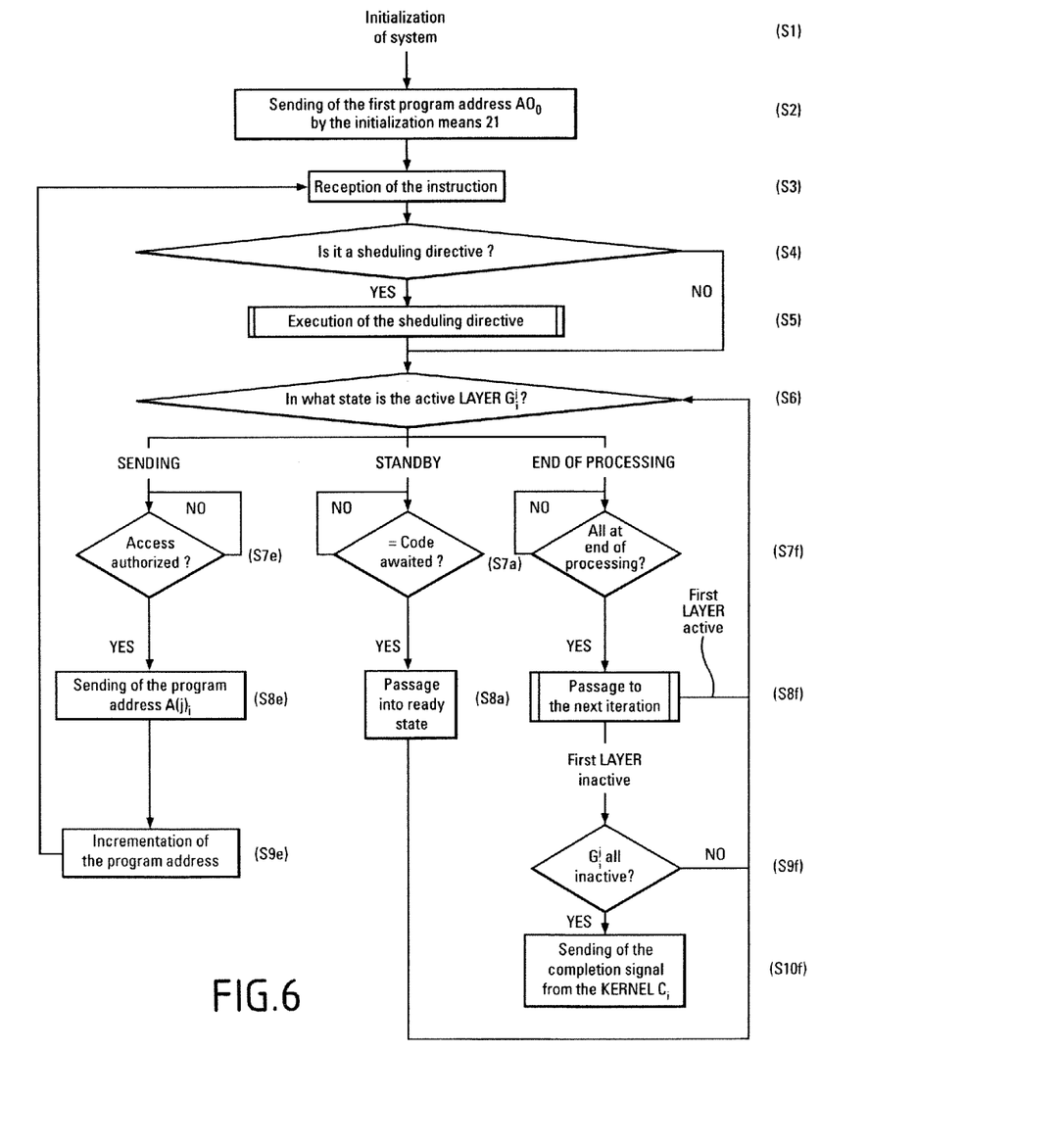

In order to initialize the execution of the program loop i, the initializing means 21 receive the command 1 to initialize the means of the organizer 2 as described in the step (S1) of the principle of operation of FIG. 6, given by way of an example. Then, this initialization means 21 sends a signal 3 on the bus 23 containing the first address received from a register loaded beforehand (step S2). The organizer 2 receives the first task 5 read at this first address which comprises a scheduling directive, namely an instruction designed for the organizer (steps S3 and S4). The organizer 2 then executes this directive (S5).

In the present exemplary embodiment, there are four scheduling directives that reflect the activity schedule pattern:

loop initializing instruction: it configures one of the KERNELS $C_i$ because it initializes the activity register $a_i^0$ in active mode and comprises the initializing parameters of the loop i (basic address $A0_i$ and/or number of iterations $N_i$ and/or number of stages $J_i$ of the loop and/or the level of imbrication i of the loop and/or the completion code or codes of the loop i and/or of the stages j of the loop i etc.)

standby instruction: it identifies the standby at the end of execution of a task and comprises for example the awaited completion code. It therefore makes it possible to wait for a task to end and for the resource 6 performing this task to be free before the next task of a same stage j is executed. It can also be used to program a standby between tasks of two different stages j and j' of one and the same loop i or of two imbricated loops i and i'. A standby of this type is justified for example by a dependence of data between the tasks or again by the use of a common resource 6, boundary instruction between two stages j and j+1: it comprises the completion code of a stage j, for example, and end of loop instruction: it indicates the end of execution of a last stage $J_i - 1$ of a loop i.

The directives described here above by way of an example comprise associated parameters and may give rise to several consecutive words of the program memory 4. One variant would consist of the use, for these three last types of directives, of a field inserted in the initialization instructions and the processing instructions.

The processing instructions comprise the parameters needed for the task (configuration parameters or microprogram micro-instructions). Indeed, information has to be given to the resource 6 before execution. This information may consist of parameters (number of iterations of a loop, address parameters, etc.) or a microprogram that the resources 6 uses, if necessary, to control the execution. The programming in this case is hierarchical because the program makes use of tasks that themselves use a microprogram.

Figure 7:
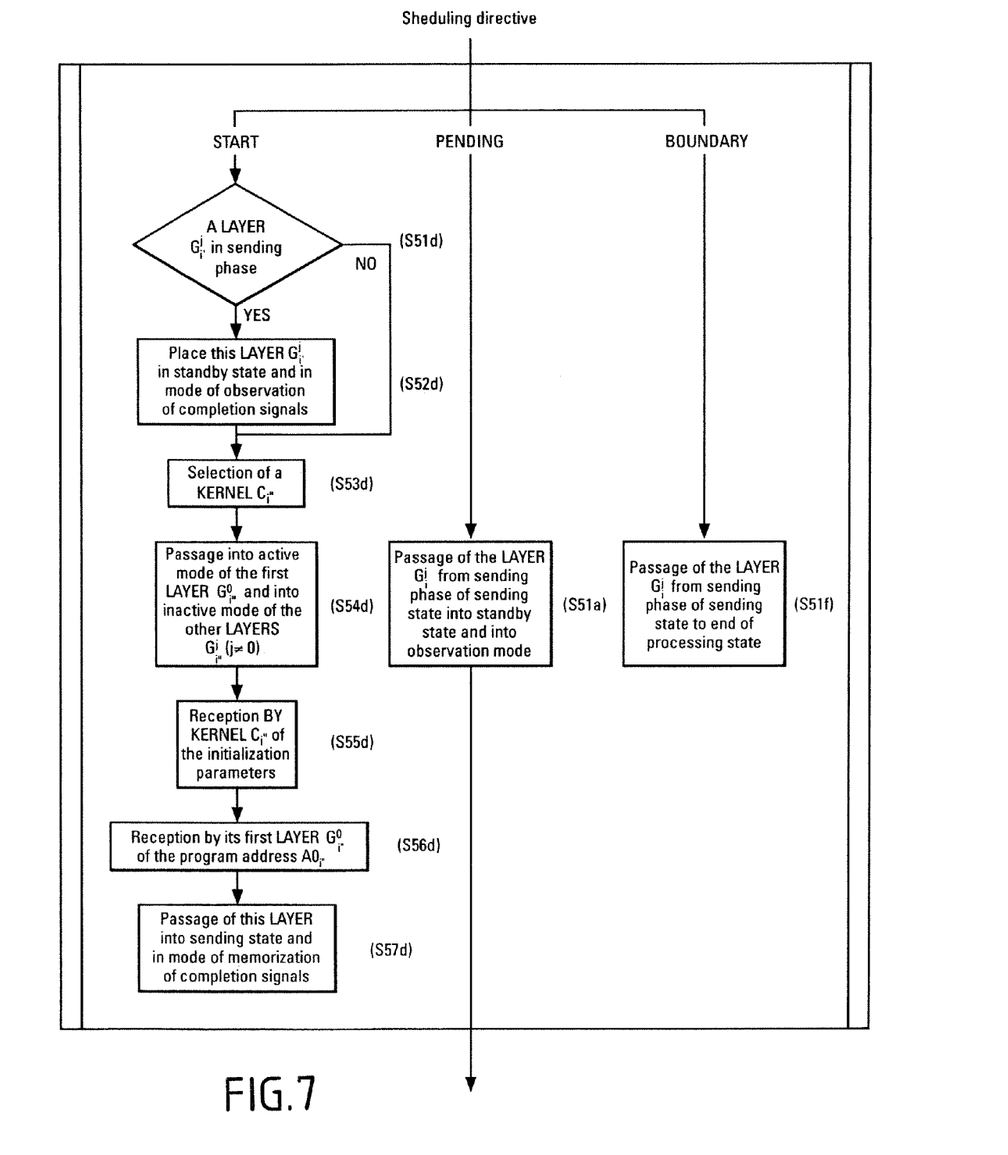

FIG. 7 shows an exemplary principle of operation of the organizer 2 during the execution of these scheduling directives.

(START) The directive read at the first address is an initialization instruction of the loop 0. The execution of this instruction induces the selection of a KERNEL $C_0$ of the organizer 2 (step S53d). The register of activity $a_0^0$ then goes into active mode and all the other activity registers $a_0^j (j \neq 0)$ go into inactive mode (step S54d). And the pipeline feed mechanism $c_0$ of the KERNEL $C_0$ receives the initializing parameters of the loop 9 (step S55d). This pipeline feed mechanism $c_0$ initializes the iteration counter at the number of the iteration to be performed by the loop 0 (it$_0$=N$_0$) and places the state registers $e_0^j$ of the LAYERS $G_0^j$ associated with KERNEL $C_0$ in the idle state. Then, it transmits the basic address to the address counter of the LAYER $G_0^0$ (ad$_0^0$=A0$_0$) (step S56d). This makes the state register $e_0^0$ of this LAYER $G_0^0$ go into sending mode and the completion detector $d_0^0$ of this LAYER $G_0^0$ go into memorization mode (step S57d).

(SENDING) The LAYER $G_0^0$ is then ready to send the address A0$_0$, contained in its address counter ad$_0^0$ (step S8e), on the address bus 23 as soon as it is allowed to do so by the arbitrator 23$^+$ of access to this bus 23 (step S7e). The instruction contained in the address sent A0$_0$ is read and executed by the resource 6 or the organizer 2 for which it is intended. The address counter ad$_0^0$ gets incremented ad$_0^0$=ad$_0^0$+1 (step S9e). So long as the instruction read is not a scheduling directive (step S3–S4), the state register $e_0^0$ remains in sending mode (step S6), the LAYER $G_0^0$ keeps its access to the bus 23, a new address A[0]$_0$ contained in the address counter ad$_0^0$ is sent (step S8e) and the address counter ad$_0^0$ is incremented (step S9e).

(STANDBY) If the instruction read is the scheduling directive "standby instruction" (steps S3 to S5), the state register $e_0^0$ of the LAYER $G_0^0$ goes into standby mode and its completion detector $d_0^0$ into observation mode. Upon reception of the completion code awaited by the LAYER $G^{00}$ from the KERNEL $C_0$, the LAYER $G_0^0$ goes into a state of sending. This indicates that it is again requesting access to the program address bus 23. The process then takes place in the same way as in the first request for access to the address bus 23 by the LAYER $G_0^0$.

(BOUNDARY) If the instruction read is the scheduling directive "boundary between two stages instruction" (steps S3 to S5), the state register $e_0^0$ of the LAYER $G_0^0$ goes to "end" of processing.

Figure 8:
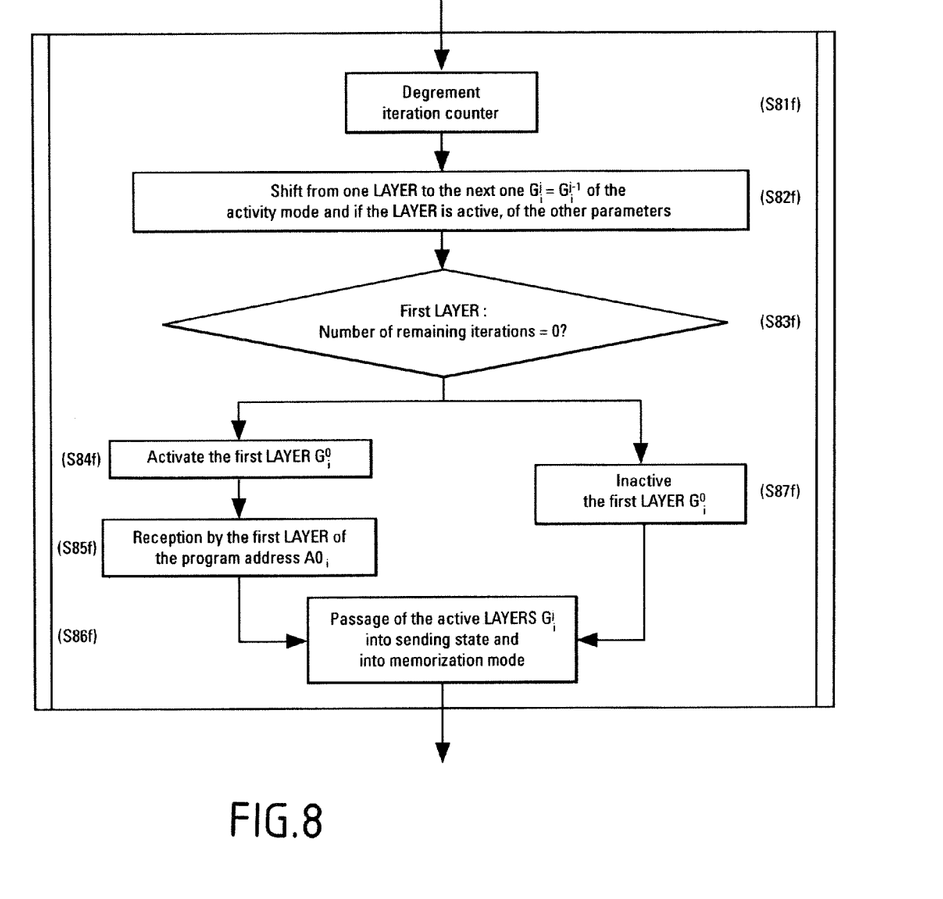
FIG. 8 is an exemplary detailed operation of the organizer during the passage to the following iteration.

(END OF PROCESSING) Since the LAYER $G_0^0$ is the only active one (either because the loop has only one stage 0 or because the other LAYERS $G_0^j$ (j≠0) are not activated), the pipeline feed mechanism $c_0$ manages the passage to the next iteration (step S8f). For this purpose, it decrements the iteration counter it$_0$=it$_0$−1 (step S81f and places the state registers $e_0^j$ of the LAYERS $G_0^j$ associated with the KERNEL $C_0$ in the idle state. Then it shifts the activity registers $a_0^j$=$a_0^{j-1}$(j≧1) and, for the active LAYERS $G_0^{j-1}$, the address counters ad$_0^j$=ad$_0^{j-1}$(j≧1) (step S82f). Finally, if the iteration counter it$_0$ has reached the value 0, the activity register $a_0^0$ of the first LAYER $G_0^0$ of the KERNEL $C_0$ is inactivated, meaning that this LAYER $G_0^0$ is in a partial end phase of the loop (step S83f–S84f). Otherwise, the activity register $a_0^0$ of the first LAYER $G_0^0$ of the KERNEL $C_0$ is activated (step S83f–S84f) and the pipeline feed mechanism $c_0$ sends the base address A0$_0$ to the address counter ad$_0^0$ of the first LAYER $G_0^0$ (step S85f). The state registers $e_0^j$ of the active LAYER $G_0^j$ go into sending mode and the completion detectors $d_0^j$ of these LAYERS $G_0^j$ go into memorization mode (step S86f).

If the loop 0 has only one stage 0 and the LAYER $G_0^0$ is in a partial end phase of the loop, i.e. if it is inactive and at the end of the processing phase in the present example, the KERNEL $C_0$ enters an end-of-loop phase comprising the sending of the signal 7 of completion of the loop 0 by the completion signal sender em$_0$ on the completion bus 27 after agreement by the arbitrator 27$^+$ (step S9f–S10f).

If the loop 0 has several stages j, then the second LAYER $G_0^1$ is active and the address counter ad$_0^1$ of this LAYER $G^{01}$ contains the last address A[0]$_0$ computed by the address counter ad$_0^0$ of the first LAYER $G_0^0$. If the loop has several iterations, the first LAYER $G_0^0$ is still active and the address counter ad$_0^0$ of this LAYER $G_0^0$ contains the basic address A0$_0$.

(SENDING) The two LAYERS $G_0^0$ and $G_0^1$ are in a sending state, namely they request access to the address bus 23. The arbitrator 23$^+$ gives priority permission for example to the second LAYER $G_0^1$ (with the order of priority ranging in this case from the last to the first LAYER of a KERNEL $C_i$). The address counter ad$_0^1$ of this LAYER $G_0^1$ then sends its address A[1]$_0$ and gets incremented ad$_0^1$=ad$_0^1$+1 (steps S7e to S9e). The instruction read at the address sent A[1]$_0$ is then the first instruction of the second stage of the loop 0 designed for one of the resources 6 or the organizer 2.

So long as the instruction read is not a scheduling directive (step S3–S4), the state register $e_0^1$ remains in sending mode (step S6), the LAYER $G_0^1$ therefore keeps its access to the bus 23, a new address A[1]$_0$ is sent (step S8e) and the address counter ad$_0^1$ incremented (step S9e).

(STANDBY) If the instruction read is the "standby instruction" scheduling directive (steps S3 to S5), the state register $e_0^1$ of the LAYER $G_0^1$ goes into standby mode and its completion detector $d_0^1$ into observation mode (step S51a). The arbitrator 22 then matches the access authorization to the address bus 23 with the first LAYER $G_0^0$ which is then still a requesting layer. Immediately upon reception of the completion code awaited by the second LAYER $G_0^1$ of the KERNEL $C_0$, the LAYER $G_0^1$ goes into the sending state (step S7a–S8a). It then again asks for access to the address bus 23. The process then runs in the same way as for the first iteration.

(BOUNDARY) If the instruction read is the "boundary between two stages instruction" scheduling directive (steps S3 to S5), then the state register $e_0^j$(j=0,1) of the LAYER $G_0^j$(j=0,1) in the sending phase, namely in the sending state and having permission to access the address bus 23, takes the end-of-processing value (step S51f).

(END OF PROCESSING) When all the state registers $e_0^j$(j=0.1) of the active LAYERS $G_0^j$(j=0.1) are at the end of processing, the pipeline feed mechanism $c_0$ can pass to the next iteration (step S7f–S8f). For this purpose, it decrements the iteration counter it$_0$=it$_0$−1 (step S81f), shifts the activity registers $a_0^j$=$a_0^{j-1}$(j≧1) and for the active LAYER $G_0^{j-1}$, the address counters ad$_0^j$=ad$_0^{j-1}$(j≧1) (step S82f).

If all the LAYERS $G_0^j$(j=0.1) are in the partial end phase, namely that the iteration counter it$_0$ has reached the value 0 and all the LAYERS $G_0^j$(j=0,1) are inactive, the execution of the loop 0 is terminated. The KERNEL $C_0$ is then in an end-of-loop phase that includes the sending of the completion signal of the loop 0 on the completion bus 27 by the completion signal sender em$_0$ after authorization by the arbitrator 27$^+$.

We have deliberately limited the above example to the control by the KERNEL $C_i$ of two LAYERS $G_1^j$(j=0,1) but it is clear that, using the same scheme as the one given in this example, the KERNEL $C_i$ can control only one LAYER or more than two LAYERS $G_i^j$(j∈ℵ).

(START) When a program contains imbricated loops, the instruction read at the address sent A[j]$_i$ by a LAYER $G_i^j$ may be a loop initialization instruction (step S4–S5). In this case, said LAYER $G_i^j$ in sending phase, namely in a sending state and having access to the program address bus, goes into the standby state and its completion detector $d_i^j$ goes into the mode of observation of the completion signal of the new KERNEL $C_{i'}(i'\neq i)$ (step $51d$–$53d$).

This new KERNEL $C_{i'}$ may be selected from among those available, for example as a function of the data elements contained in the field NUMSEQ of the initialization instruction of the loop i'. The loop initializing instruction will work in the same way for the imbricated loop i' as for the main loop 0. The new KERNEL $C_{i'}$ could also implement several LAYERS $G_{i'}^{j'}$ and work in the same way as the KERNEL $C_0$ controlling the management of the execution of the main loop 0.

The functions of the organizer 2 according to the invention are numerous. It can for example manage the execution of a sequence of tasks:

in multimode. Indeed, the organizer 2 may work in multimode because the initializing means 21 can be used to insert an iteration of a loop i' of a program different from that of the loop i which it was in the process of managing because the multimode operation, as its name indicates, has several modes. For this purpose, it is enough for example that the initialization means should give a different address $A0_0$ corresponding to a loop i' instead of the loop i (see the step S85f). A mode corresponds to a processing chain fixed in advance that is applied to a set of data elements during a time interval called a recurrence. The successive recurrences may bear different modes, for example:

```
Recurrence N:          Recurrence N+1:
{                      {
Loop 0                 Loop 2
Loop 1                 }
}
``` by anticipation. The anticipation function of the organizer 2 is used to anticipate the programming of the resources 6, i.e. to avoid waiting for the end of the execution 7 of the task 5 in a resource 6' to program the next task for the next resource 6''. Indeed, this makes it possible, when a task 5 has just been launched, to program the resources 6 for the next task. For this purpose, the resource 6'' must accept two memory zones for its program. To program the first task for each LAYER $G_i^j$ during the previous iteration, the activity register chain may for example be duplicated and the task may be defined.

in taking account of the iteration to access data. A multidimensional iteration counter, may be used to associate, with each iteration, accesses to multidimensional data tables. This is an example of use of an iteration counter $it_i$ to compute a memory address to access different data as a function of the iterations of the loop. The value of the multidimensional counter $it_i[j]$ may then be passed from LAYER $G_i^j$ to LAYER $G_i^{j+1}$ through a shift register just as the activity registers $a_i^j$ and the address counters $ad_i^j$ are shifted so that the value truly corresponds to the progress of each LAYER $G_i^j$ of the chain in the loop i.

in associating a data buffer with a KERNEL $C_i$. The iteration counter $it_i$ of each KERNEL $C_i$ provides for a data buffer management associated with the pipeline (with the chain formed by the KERNEL $C_i$ and the associated LAYERS $G_i^j$). This means that the reservation of a memory zones for each iteration of the loop I managed by the organizer 2 is possible. When the iteration is ended, the memory zone can be released for a new iteration either by computing the value of the iteration counter $it_i$ modulo the number of LAYERS $G_i^j$ used or by using a counter working at the same pace as the iteration counter $it_i$ of the KERNEL $C_i$, whose value has passed from LAYER $G_i^j$ to LAYER $G_i^{j+1}$ through a shift register.

The list of functions presented here above is not restricted.

The first variant of the organizer 2 lies in the fact that the LAYERS G are not physically linked to a special KERNEL $C_i$. Any kernel KERNEL $C_i$ may use any LAYER G by multiplexing the information exchanged between a KERNEL $C_i$ and the LAYERS G.

The second variant of the organizer 2 groups together the registers contained in the LAYERS $G_i^j$ in a generalized bank of registers accessible by all the LAYERS $G_i^j$. This solution requires that all the activity registers $a_i^j$ and all the state registers $ad_i^j$ of the LAYERS $G_i^j$ associated with a kernel KERNEL $C_i$ should be capable of being read at each cycle.

In a third variant, the scheduling directives can either be covered by an instruction in the same way as all the instructions that program the resources 6 or else be covered only by instruction fields associated with the other instructions.

What is claimed is:

1. A system used for the management of a multiple-resource architecture in which several resources can simultaneously execute different tasks, the tasks each including a corresponding program loop and each program loop including a plurality of hierarchical stages, wherein the system comprises:

a plurality of management means for commanding execution of each hierarchical stage of each program loop on the corresponding one of several resources, a plurality of control means for controlling each of the plurality of management means found in each hierarchical stage of the program loop, wherein each control means is associated with a different hierarchical stage of a control loop from any other control means, completion verification means for verifying completion of each hierarchical stage of each program loop, wherein each hierarchical stage is connected to any next hierarchical stage via a cascade connection, the set of hierarchical stages comprises a shift register chain, and the control means further controls a pipeline of data associated with the cascade connected hierarchical stages and synchronizes the stages with each other using a pipeline feed means.

2. The system according to claim 1, wherein each completion verification means comprises:

at least one completion signal sender associated with all or part of the plurality of management means and all or part of the plurality of control means, each sender sending a signal indicating the end of execution of one or more of the given tasks, at least one completion detector associated directly or indirectly with all or part of the plurality of management means, each completion detector being configured to receive completion signals from at least one of the completion signal senders and from at least one of the resources.

3. The system according to claim 2 wherein each completion verification means further comprises:

a single completion bus transmitting the completion signals sent by each completion signal sender and each resource to the completion detectors, and an arbitration means for arbitrating access to said bus.

4. The system according to claim 1, further comprising:

one or more outputs configured to send an address of each task to be executed on a resource, comprising a link with the plurality of management means and the plurality of control means, one or more inputs configured to receive each task to be executed on a resource, comprising a link with the plurality of control means, one or more inputs configured to receive an initializing command and one or more inputs configured to transmit completion signals from the resources to the completion verification means associated with the plurality of control means and the plurality of management means.

5. The system according to claim 4 further comprising:

a single input configured to receive the initializing command, a single output configured to send the address of each task to be executed on a resource, comprising a link with the plurality of management means, a single input configured to receive each task to be executed on a resource, comprising a link with the plurality of control means, and a single input configured to receive the completion signals from the resources, comprising a link with completion detectors.

6. The system according to claim 5 further comprising:

a single address bus configured to connect the plurality of management means to the single output, and arbitration means for arbitrating access to said address bus.

7. The system according to claim 6 wherein:

an address contained in at least one of the plurality of management means is sent when:

said at least one of the plurality of management means is in a sending phase and in a state of sending with permission to send, and said sending induces the incrementation of said address contained in said at least one of the plurality of management means.

8. The system according to claim 7 wherein at least one of the plurality of management means in a sending state goes into a sending phase of the sending state when said arbitration means for arbitrating the access to the address bus permits said at least one of the plurality of management means to send on the address bus.

9. The system according to claim 6 wherein, when one or more of the tasks received by the plurality of control means comprises an instruction for the initialization of a set or subset of one or more of the tasks, the system comprising:

at least one of the plurality of control means for controlling, the control means chosen from among those available, whereby the control means receives the initialization parameters contained in said initialization instruction, wherein the initialization instruction comprises the number of parts of said set or subset of the tasks, at least one of the plurality of management means associated with said control means whereby the management means receives a basic address and goes into a sending state, and the completion verification means associated with said management means whereby the completion verification means goes into completion memorization mode.

10. The system according to claim 9 wherein, when the task to be executed received by at least one of the plurality of control means comprises an instruction for the initialization of a set or subset of one or more of the tasks, and when at least one of the plurality of management means for commanding the execution of a part of a set or subset of one or more of the tasks, is in the sending phase, the at least one of the plurality of management means in the sending state goes into a standby state.

11. The system according to claim 1 wherein, after the system receives an initialization command, the system:

sends a first address signal of the address at which an initialization instruction is located, activates the first of the plurality of management means associated with each of the plurality of control means and deactivates the other of the plurality of management means.

12. The system according to claim 1 wherein, when one or more of the tasks to be executed, is received by at least one of the plurality of control means, wherein the control means includes an instruction for placing on standby, the management means in the sending state goes into a standby state.

13. The system according to claim 12 wherein, when at least one of the plurality of management means goes into a standby state, the completion verification means associated with said management means goes into mode of observation for observing an awaited completion, wherein the mode of observation of the awaited completion includes the completion of the sub-set of the tasks indicated by the instruction of initialization or by the standby instruction, wherein the completion verification means in observation mode performs the following operations:

observes the instances of completion and detects the awaited completion among those memorized during a completion memorization mode and those observed, and wherein, when the completion verification means associated with said management means detects the awaited completion, said management means goes into a sending state, and the completion verification means associated with said management means goes into the completion memorization mode.

14. The system according to claim 1 wherein, when one of the tasks to be executed received by at least one of the plurality of control means comprises an instruction indicating the boundary between two parts, at least one of the plurality of management means in the sending state goes into an end-of-processing state.

15. The system according to claim 14 wherein, when a set or a subset of one or more of the tasks is a program loop and when each of the plurality of management means corresponds to an active LAYER of at least one of the plurality of control means configured as a KERNEL is in an end-of-processing state:

said KERNEL goes from the management of an iteration o the management of the next iteration of the loop, each LAYER of said KERNEL takes at least a part of the parameters of the previous LAYER, when said LAYER is not in an end-of-processing state of the iteration of said loop, a first LAYER receives the basic address, when said first LAYER is not in a state of end of processing of the iteration of said loop, each LAYER having received an address goes into a sending state, and the completion verification means associated with the LAYERS in a sending state goes into a state of memorizing completions.

16. A system according to claim 14 wherein, when each of the plurality of management means is at the end of processing and, in the case of a loop, each of the plurality of management means is in the state of the end of processing of the iteration of said loop, at least one of the plurality of control means indicates the completion of the execution of the set or subset of one or more of the tasks.

17. A method for the management of a multiple-resource architecture in which several resources simultaneously execute different tasks, wherein the method comprises:
managing an execution of a plurality of hierarchical stages of a plurality of program loops, each corresponding to one of the tasks on a corresponding one of several resources;
controlling the management of the execution in each hierarchical stage of each program loop, wherein the controlling is preformed for each of the hierarchical stages;
verifying the completion of the execution of each of the plurality of hierarchical stages of each of the plurality of program loops,
wherein each hierarchical stage is connected to a next hierarchical stage via a cascade connection,
the set of hierarchical stages comprises a shift register chain, and
the controlling further controls a pipeline of data associated with the cascade connected hierarchical stages and synchronizes the stages with each other using a pipeline feed mechanism.

18. The method according to claim 17, wherein the verification of completion further comprises:
sending a signal indicating the end of execution (completion) of one or more given tasks during the management and control, and
detecting the completion signal awaited during the management comprising the reception of the completion signals sent during the management, control and execution.

19. The method according to claim 17 wherein a first address at which an initialization instruction is found is received.

20. The method according to claim 17, wherein managing the execution in the sending state with permission to send, further comprises:
sending an address at which the task to be executed is located,
simultaneously passing from the address to another address.

21. The method according to claim 17 wherein:
controlling the management of the execution further comprises:
executing an instruction of initialization,
receiving, during said execution, the parameters of initialization, said parameters comprising the number of parts a basic address,
transmitting said basic address received, and wherein managing the execution further comprises:
receiving said basic address transmitted during the controlling of the management, passing to a sending state when activated by said reception, the verifying of completion comprising the passing into a mode of memorization of instances of completion activated by said passing into the sending state.

22. The method according to claim 21 wherein, when the instruction of initialization is executed during the controlling the management of the execution and when the managing of the execution is in a sending phase:
the controlling the management of the execution comprises the execution of said instruction of initialization, and
the managing the execution comprises passing to a standby state activated by the execution, during said controlling the management, of said initialization instruction whose completion is awaited.

23. The method according to claim 22 wherein:
the verifying of completion further comprises passing the system into an observation mode activated by the passage into standby state of the managing, the passing into observation mode comprising:
observing the instances of completion and
detecting the awaited completion memorized during the memorization mode, wherein
managing the execution in the sending phase comprises passing the system into the standby state activated by said detection of the awaited completion, and wherein
the verifying completion further comprises passing the system into the mode of memorization of the instances of completion activated by said passage into the sending state.

24. The method according to claim 17 wherein:
controlling the management further comprises the execution of an instruction for placing on standby when the managing the execution is in a sending phase, and
wherein: the managing the execution in the sending phase further comprises passing the system into the standby state activated by said execution indicating completion is awaited.

25. The method according to claim 17 wherein:
when the managing the execution is in the sending phase, the controlling of management of the execution further comprises the execution of an instruction indicating the boundary between two parts and, and wherein
the managing of the execution further comprises passing the system into the end-of-processing state activated by said execution of the instruction indicating the boundary between said part and the following part.

26. The method according to claim 25 wherein, when a program loop exists and when the managing of the execution of each of the stages of the loop is in an end-of-processing state:
the controlling management of the execution of the loop comprises:
passing the system into the next iteration,
transmitting an address obtained during the managing the execution of a state of said loop,
when the managing the execution of the following stage of said loop is not in a state of end of processing of the iteration of said loop, transmitting a basic address of a first state,
when the managing of the execution of the first stage of said loop is in the state of the end of processing of the iteration of said loop (i), and the managing of the execution of a stage of said loop comprises: the reception of said transmitted address, basic address for the first state, and another address coming from the management of the execution of the previous stage of said loop, and passing into the sending state activated by said reception, the verifying completion further comprises passing the system into the mode of memorization of instances of completion activated by said passage into sending state 27. The method according to claim 25 wherein, the controlling of management of the execution further comprises reporting completion as soon as the managing of the execution is in an end-of-processing state and, in the case of a loop, in a state of end of processing of an iteration of said loop.

28. A system used for the management of a multiple-resource architecture in which several resources can simultaneously execute different tasks, at least one of the tasks including a corresponding program loop and each program loop including at least one hierarchical stage, wherein the system comprises:

at least one management means for commanding execution of each hierarchical stage of each program loop on the corresponding one of several resources, at least one control means for controlling each of the at least one management means found in each hierarchical stage of each program loop, wherein each control means is associated with a different hierarchical stage of a control loop from any other control means, at least one completion verification means for verifying completion each hierarchical stage of each program loop, wherein each hierarchical stage is connected to any next hierarchical stage via a cascade connection, the set of hierarchical stages comprises a shift register chain, and the control means further controls a pipeline of data associated with the cascade connected hierarchical stages and synchronizes the stages with each other using a pipeline feed means.

* * * * *